United States Patent
Liu et al.

(10) Patent No.: US 8,775,588 B2
(45) Date of Patent: Jul. 8, 2014

(54) METHOD AND APPARATUS FOR TRANSFORMING WEB SERVICE POLICIES FROM LOGICAL MODEL TO PHYSICAL MODEL

(75) Inventors: Xin Peng Liu, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 11/762,869

(22) Filed: Jun. 14, 2007

(65) Prior Publication Data

US 2008/0065466 A1    Mar. 13, 2008

(30) Foreign Application Priority Data

Jun. 23, 2006  (CN) .......................... 2006 1 0093192

(51) Int. Cl.
*G06F 15/173* (2006.01)
*G06F 17/15* (2006.01)
*G06G 7/62* (2006.01)

(52) U.S. Cl.
USPC ........................................... 709/223; 703/13

(58) Field of Classification Search
USPC ..................... 709/223, 246; 703/13
See application file for complete search history.

(56) References Cited

U.S. PATENT DOCUMENTS

| | | | |
|---|---|---|---|
| 6,701,459 B2 * | 3/2004 | Ramanathan et al. | 714/37 |
| 7,113,900 B1 * | 9/2006 | Hunt et al. | 703/13 |
| 7,512,578 B2 * | 3/2009 | Abnous et al. | 706/47 |
| 2003/0120817 A1 | 6/2003 | Ott et al. | |
| 2003/0225801 A1 * | 12/2003 | Devarakonda et al. | 707/205 |
| 2004/0117407 A1 * | 6/2004 | Kumar et al. | 707/200 |
| 2005/0289244 A1 | 12/2005 | Sahu et al. | |
| 2006/0069717 A1 | 3/2006 | Mamou et al. | |

* cited by examiner

*Primary Examiner* — Brian J Gillis
(74) *Attorney, Agent, or Firm* — Steven L. Nichols; VanCott, Bagley, Cornwall & McCarthy P.C.

(57) ABSTRACT

A physical service and policy model of a service-oriented architecture system is generated from a logic model. Web service policies are transformed from the logical model to the physical model. The logical model includes a plurality of logical service components and logical dependency relationships among the logical service components. At least one of the logical service components has been specified with logical policies. The physical model includes physical components and physical dependency relationships associated with the service components and tire logical dependency relationships among the service components in the logical model. Effective logical policies are calculated for each of the logical service components and mapped to associated physical components in the physical model.

17 Claims, 9 Drawing Sheets

METHOD AND APPARATUS FOR TRANSFORMING WEB SERVICE POLICIES FROM LOGICAL MODEL TO PHYSICAL MODEL

CROSS-REFERENCE TO RELATED APPLICATIONS

This application is related to application Ser. No. 11/762,894, entitled "Method and Apparatus for Orchestrating Policies in Service Model of Service-Oriented Architecture System", filed concurrently herewith and assigned to the assignee of the present invention.

BACKGROUND OF THE INVENTION

The invention relates to the field of data, processing, and particularly, relates to a method and apparatus for transforming web service policies from logical model to physical model, and a method and system for generating a physical service and policy model of a service-oriented architecture (SOA) system.

As web service applications have become more complex, the first generation web service architecture no longer adequately accommodates development requirements for current web services. Thus, a Service-Oriented Architecture (SOA) has been proposed. SOA establishes the concept that a web service system may be composed of a series of sub-systems or services that are separate but that cooperate with each other. Such a structure enables the services to be separated. Each service needs only inform other services of its declared interface. Therefore, SOA allows corporation business flows to be created that are only loosely coupled. Where SOA concepts are used, a web service system may be formed by web services executed in remote and different domains, replacing the conventional hierarchical structure of a system with service flows across various business areas.

In order to satisfy a user's requirements for quality of service, a SOA system should comply with a Service Level Agreement (SLA) that defines the level of service expected by the user. Web service policies are used to describe the requirements and abilities of a web service in its interactions with other web services or consumers and are important in setting up Service Level Agreements.

The Web Services Policy Framework (WS-Policy) defined by IBM, BEA, Microsoft and others is the de facto standard for Web Services policy. It provides a common model and corresponding syntax to describe policies of a web service. WS-Policy is intended to allow for extensibility. That is to say, WS-Policy defines a base set of constructs that can be used and extended by other web services specifications to describe a broad range of service requirements and capabilities (the non-functional part). Base on WS-Policy, a set of standards have been defined for different perspectives of a system, including Web Service Reliability Messaging Policy (WS-RM Policy), Web Service Security Policy (WS-Security Policy), Web Service Atomic Transaction (WS-AtomicTransaction), Web Service Policy Assertions (WS-PolicyAssertions), etc. Users can also define policy languages based on WS-Policy and related standards for their needs.

The current WS-Policy definition tool, however, is not ideal and has at least the following drawbacks:

1. It focuses on a single set of policy assertions attached to the policy subject and does not take the impact of system context into consideration;
2. The policy subject is limited to service level and below granularities such as service, port, operation, and message;
3. It does not support top-down SOA system design methodology from abstract level to physical level and lacks an automation tool for policy transformation and deployment;
4. Policy allocation and consistency validation of related policy subjects is postponed to runtime, when the reallocation or reconfiguration becomes more inflexible and expensive.

SUMMARY OF THE INVENTION

The present invention can transform web service policies from a logical model to a physical model, and generate a physical service and policy model of a service-oriented architecture (SOA) system, so that service policy integration, transformation, and verification can be realized automatically at the design time of SOA system.

According to an aspect of the present invention, there is provided a method for transforming web service policies from logical model to physical model, wherein tire logical model includes a plurality of logical service components and the logical dependency relationships among the plurality of logical service components, and at least one of the plurality of logical service components has been specified with logical policies, the physical model comprises physical components and physical dependency relationships associated with the plurality of service components and the logical dependency relationships among the plurality of service components in the logical model, respectively. The method calculates the effective logical policies for each of the plurality of logical service components in the logical model and maps each effective logical policy of each logical service component in the logical model to at least one associated physical component in the physical model.

According to another aspect of the present invention, there is provided a method for generating a physical service and policy model of a service-oriented architecture system. A logical service model is created for the service-oriented architecture system for which a physical service and policy model is to be generated. Logical policies are defined for the logical service model to generate a logical service and policy model of the service-oriented architecture system on the basis of the logical service model. The logical service model in the logical service and policy model is transformed into a physical service model of the service-oriented architecture system. Logical policies in the logical service and policy model are transformed to the physical service model using the method for transforming web service policies from logical model to physical model, to generate a physical service and policy model of the service-oriented architecture system.

The invention may also be embodied in an apparatus, a system or in a computer program product that are capable of earning out the actions described above.

DETAILED DESCRIPTION OF THE INVENTION

Figure 1:
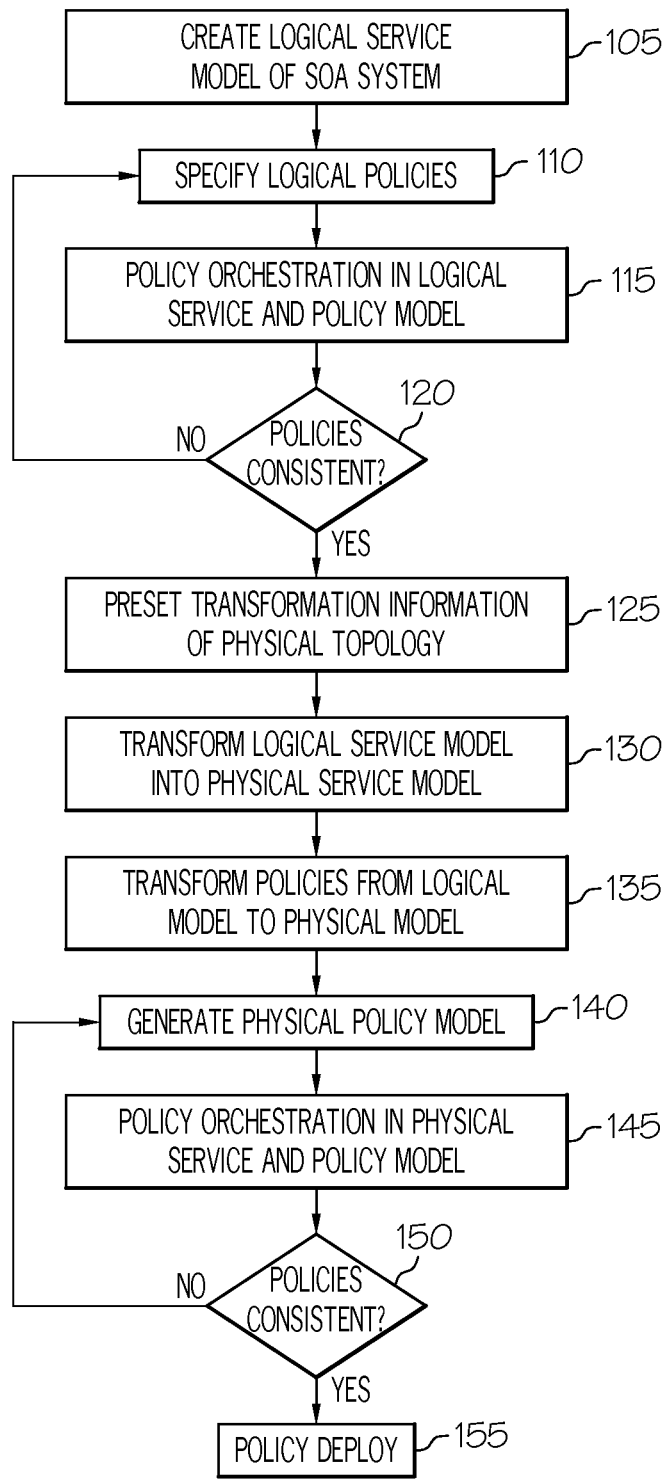
FIG. 1 is a flow chart illustrating a method for generating a physical service and policy model of a service-oriented architecture system according to an embodiment of the present invention.

FIG. 1 is a flow chart of a method for generating a physical service and policy model of a service-oriented architecture system according to an embodiment of the present invention. It will be readily understood that aspects of the present invention, including the methods described in relation to the Figures and the appended claims, may take the form of a computer program product embodied in one or more computer usable medium(s) having computer readable program code embodied thereon. As shown in FIG. 1, at Step 105, a logical service model is created for the designed SOA system. In this step, for example, a system designer determines a logical model containing the logical service components constituting the designed SOA system and the logical dependency relationships among the logical service components.

In the logical model, each logical service component can implement one or more services specified in detail by WSDL (Web Service Definition Language) as a service provider. Likewise, each logical service component can also invoke zero or more other services as a service consumer. Furthermore, it is noted that, in the logical service model of the SOA system, a logical service component only represents a functional unit, and does not relate to the actual implementation, and the WSDL for describing the logical service components only bears the abstract part of operation definitions and parameters' data formats of the service components.

Moreover, in the logical service model of the SOA system, the logical dependency relationships among the logical service components are represented by directional links. A directional link from one service component to another service component represents the direction of service invocation from a service consumer to a service provider. Furthermore, in the logical service model, these links represent only consumer-provider relationships, and do not relate to technical implementations.

In the process of creating the logical service model of the SOA system, a system or a sub-system may sometimes be defined. A system or a sub-system is a set of logical service components with virtual boundary and relationship. A system may further contain one or more sub-systems. It is noted that system or sub-system is only a logical level term. When the logical model is transformed into a physical model, tire system or the sub-system diminishes and is replaced by a certain technical implementation topology. Therefore, a system or subsystem at logical level actually corresponds to a set of systems within an application domain at physical level. Such an application domain at physical level may comprise a set of services connected by an Enterprise Service Bus or ESB (examples of which are Service Integration Bus or SiBus, WebSphere Enterprise Service Bus or WESB, and Message Broker), a static Service Component Architecture (SCA) assembly model, or a WeB Intermediaries (WBI) Gateway, etc.

Figure 5A:
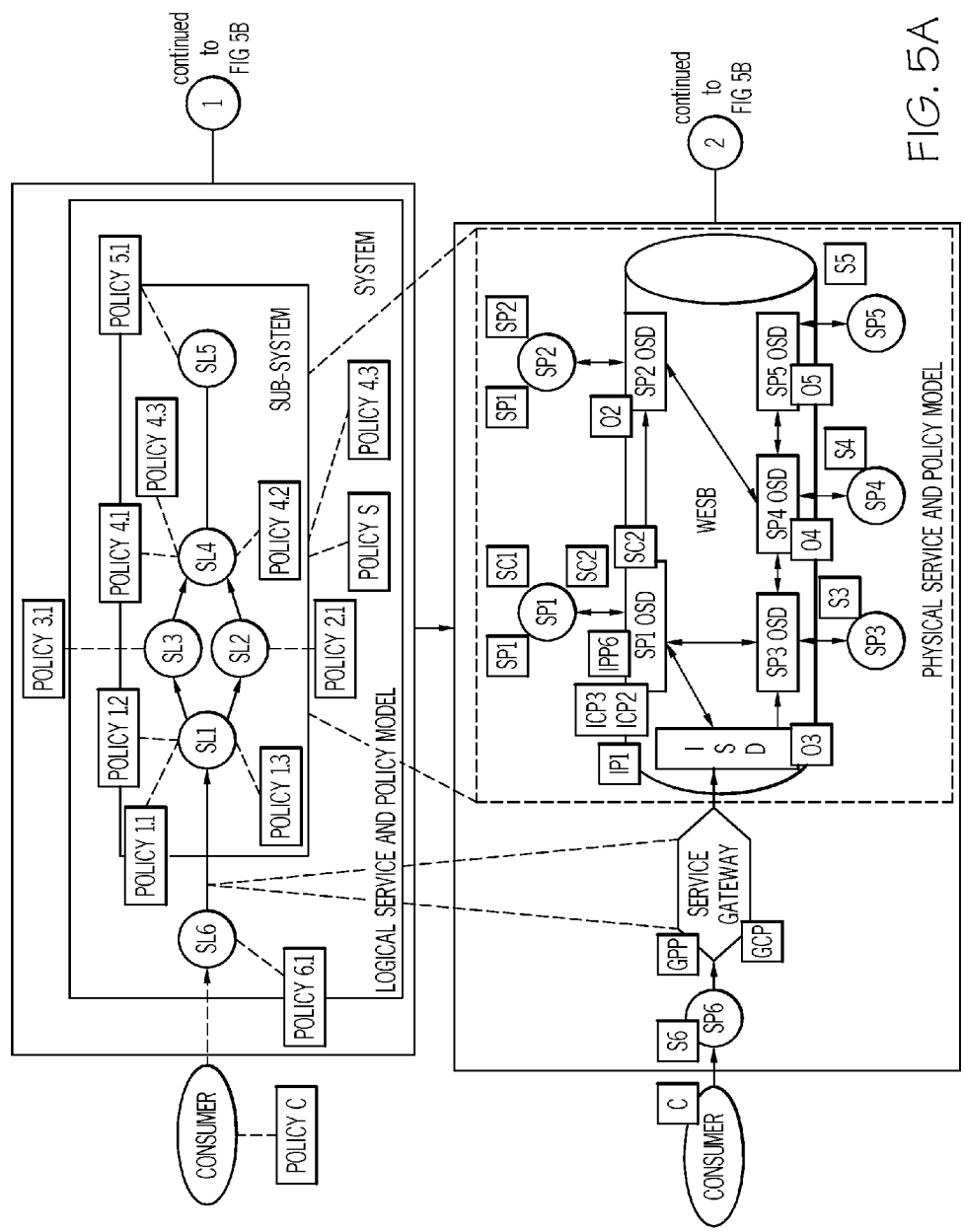
FIG. 5 is a schematic diagram illustrating the transformation of a logical service policy model to a physical service policy model for an exemplary SOA system according to an embodiment of the present invention.
Figure 5B:
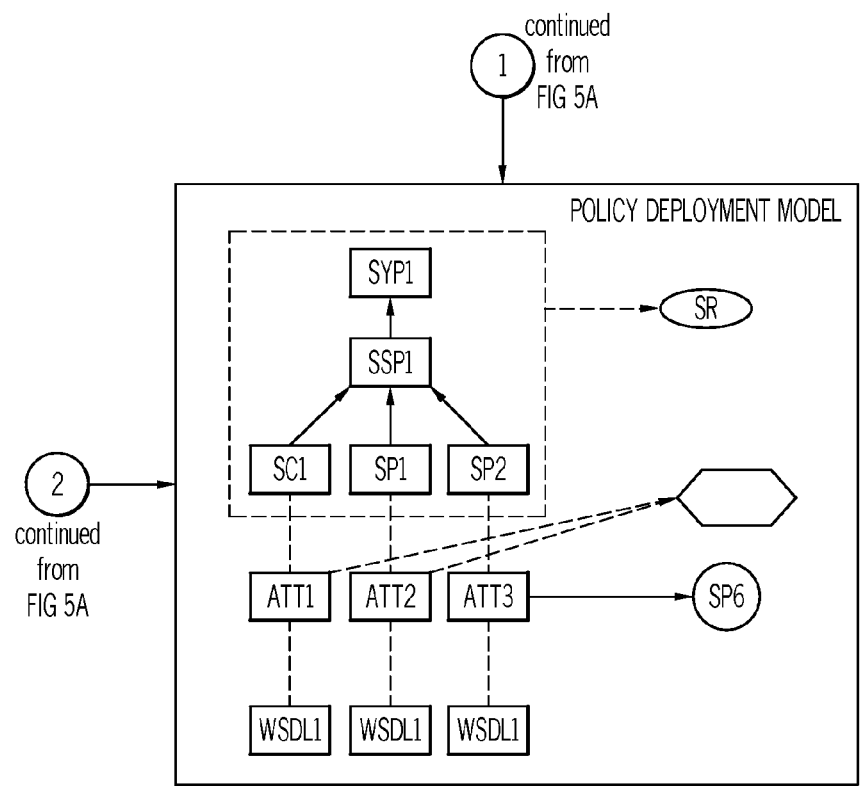

The logical service model of the SOA system will be specifically described in the following by way of an example. FIG. 5 is a schematic diagram illustrating the transformation of a logical model into a physical model for an exemplary SOA system according to the present invention. As shown at the logical level in the upper part of FIG. 5, the logical service model of the SOA system comprises a plurality of logical service components SL1, SL2 SL3, SL4, SL5, SL6, each of which can implement one or more services. The logical service components are connected by the arrows "→" representing the logical dependency relationships among them. Each arrow "→" represents the direction of service invocation from a service consumer to a service provider. Furthermore, in the logical service model of the SOA system, the logical service components SL1, SL2, SL3, SL4, SL5 and the logical dependency relationships among them consist of a sub-system (as shown by the small round-cornered rectangular block in the figure), while the sub-system and the logical service component SL6 and the logical dependency relationship between them consist of the whole system (as shown by the large round-cornered rectangular block in the figure).

It is noted that the logical service model of the SOA system in FIG. 5 is only illustrative. The logical service components, the composition of the system and the sub-system shown are not meant to limit the form of the logical service model in present invention. There is no particular limitation on the form of the logical service model of the SOA system in the invention. Further, only six logical service components and one hierarchy of sub-system are illustrated in FIG. 5 for the purpose of convenience of description, while in practice, along with the development of the web service architecture, the functions to be implemented and the services to be provided by an SOA system will be more diverse, making a typical logical service model far more complex than that shown in the figure.

Further, referring back to FIG. 1 in the present embodiment, the objective of creating a logical service model for the designed SOA system in Step 105 is to obtain the logical service model of the designed SOA system. That is, in the present embodiment, the logical service model of the SOA system may be created manually by the system designer. However, there is no particular limitation on the way to obtain the logical service model of the SOA system in the present invention. In other embodiments, therefore. Step 105 may be excluded, and the corresponding logical service model of the SOA system obtained directly as a result of other pre-design-phase of the SOA system or obtained by transformation from other system model.

At Step 110, logical policies are specified for the logical service model. In this step, in particular, the logical policies are defined for the logical service components, the sub-system and the system in the logical service model. The logical policies may include reliability messaging policies, security policies, atomic business policies, and the like.

Logical policies defined for a logical service component may comprise two types: consumer policies and provider policies. Consumer policies describe the capabilities, requirements and constraints of the logical service component when serving as a service consumer invoking other logical service components, while the provider policies describe the capabilities, requirements and constraints of the logical service component when serving as a service provider being invoked by other logical service components. Moreover, the logical policies of a logical service component may be defined with respect to supporting-service granularities such as message, operation, port, port type, etc, defined by WSDL.

Logical policies defined for a system or a sub-system are usually policies that are related to Service Level Agreement (SLA) and Quality of Service (QoS) and that are effective to all composing logical service components of the system or sub-system. Defining policies for a system or a sub-system is a convenient way to define the same policies for a batch of logical service components, and provides an abstraction to physical level topologies with similar logical structures.

The logical service model having been specified the logical policies, as well as such logical policies constitute the logical service and policy model of the SOA system.

At Step 115, policy orchestration is conducted in the logical service and policy model, to ensure the consistency and the correctness of the policies, thereby reducing the possibility of inconsistency policy enactment and enforcement in tire SOA system design phase. It will be described in detail in the following as to the policy orchestration method.

At Step 120, a decision is made whether or not the policies in the logical service and policy model are consistent after the policy orchestration conducted in the logical service and policy model. If there are inconsistent policies, then the process returns to Step 110 to redefine or modify the policies, otherwise it proceeds to Step 125.

At Step 125, transformation information for physical topology is preset in the logical service and policy model. In this step, the system designer conducts the customization actions which are sensible to further logical-physical model transformation for the logical service and policy model.

In the present embodiment, in particular, such customization behaviors may comprise presetting a physical topology pattern applied when the logical service model is transformed into physical model. That is, the system designer may mark a certain granularity of system (several logical service components, a subsystem and a system containing other subsystems and logical service components) in the logical service aid policy model, and choose for it a physical topology pattern desired to be applied when it is transformed into physical model from available physical topology pattern options, such as ESB (Enterprise Service Bus) pattern option, standard business process pattern option, SCA (Service Component Architecture) assembly option, etc.

In the present embodiment, customization behaviors can further comprise presetting, for the logical service dependency relationships among the logical service components in the logical service model, information allowing for the policy definition of a newly added physical component. Since it is often desired that all service components within a sub-system, be located in one business entity in the SOA system, access to these service components from somewhere outside the business entity, namely external to the sub-system, is usually guarded by a gateway.

Therefore, as to an invocation link between different sub-systems in the logical service model, there usually will exist a gateway on the path of the invocation link after the logical service model is transformed into the physical service model. Consequently, in the present embodiment, presetting is allowed for a invocation link between different sub-systems in the logical service model, before the logical service model is transformed into the physical service model, information about the invocation link being to be mapped as a gateway, that is, presetting information about allowing for definition of policies for the physical component, such as gateway, newly appeared on the path of the invocation link in the transformed physical service model.

Then at Step 130, the logical service model in the logical service and policy model is transformed into the physical service model. In this step, in particular, the logical service components in respective sub-systems of the logical service model and the invocation (dependency) relationships among them are transformed into a physical service model in the preset physical topology pattern, with, physical artifacts specific to the physical topology pattern, such as ESB, gateway, message destination, etc, being included in the physical service model.

In the case of FIG. 5, for example, the logical service components SL1, SL2, SL3, SL4, SL5, SL6 in the logical service model are transformed into the physical service components SP1, SP2, SP3, SP4, SP5, SP6 in the physical service model, and the invocation flow within the sub-system of the logical service model is transformed into the mediation flow within SiBus as well as the necessary infrastructure artifacts of SiBus environment, such as outbound/inbound service destinations and mediation modules in the physical service model. What's more, the logical invocation from the logical service component SL6 to the logical service component SL1 within the subsystem in the logical service model is mapped to the addition of a service gateway on the physical invocation path from the physical service component SP6 to the SiBus environment in the physical service model.

In the transformation process from the logical service model into the physical service model, it is also required that the concrete definition by WSDL is carried out to each physical service component in the transformed physical service model. As each physical service component in the transformed physical service model only inherits the abstract WSDL from the corresponding logical service component in the logical service model, in order to implement a particular physical service module, the concrete WSDL interface reference problem of the physical service component needs to be resolved.

Therefore, the entries in the concrete parts of WSDL should be completed, such as the protocol binding and endpoint address for the respective physical service components in tire physical service model, so that the WSDLs of the respective physical service components describe the interface of a corresponding composing service module that the SOA system designer finally selects. It is known that there are various products that may perform the transformation process from the logical service model into the physical service model.

At Step 135, the policies of the logical service and policy model are transformed to the physical service model, to generate the physical service and policy model of the SOA system. In this step, each effective logical policy of each logical service component in the logical service model is mapped to at least one related physical component in the physical service model.

A method for transforming web service policies from a logical model to a physical model according to the present invention will be described below.

Figure 2:
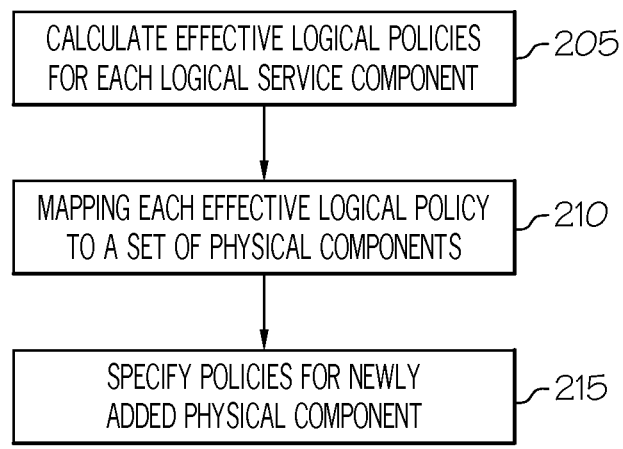
FIG. 2 is a flow chart illustrating a method for transforming web service policies from a logical model to a physical model according to an embodiment of the present invention.

FIG. 2 is a flow chart illustrating a method for transforming web service policies from a logical service and policy model to a physical service and policy model according to an embodiment of the present invention. As mentioned above, the logical service and policy model comprises a plurality of logical service components aid the logical dependency relationships among the plurality of logical service components, and at least one of the logical service components is specified with logical policies. Moreover, the logical service and policy model further comprises a sub-system constituting at least one logical service component. The physical service and policy model comprises the physical components and physical dependency relationships associated with the logical service components and the logical dependency relationships among the plurality of logical service components in the logical service and policy model.

As shown in FIG. 2, at Step 205, effective logical policies are calculated for each of the plurality of logical service components in the logical service and policy model. In this step, in particular, effective logical policies are calculated for respective logical service components in the logical service and policy model as follows. As to the system including at least one logical service component in the logical service and policy model, if it is specified with corresponding logical policies, then, clue to the logical policies of the system are effective to each logical service component belonging to the system, for each logical service component in the system, the union set of its logical policies and the logical policies of the system is taken. As to the first-level sub-system including at least one logical service component: in the logical service and policy model, if it is specified with corresponding logical policies, then, likewise, for each logical service component in the first-level sub-system, the union set of its logical policies, the logical policies of the first-level sub-system and the logical policies of the system the first-level sub-system belongs to is taken. The same process is observed for nested sub-systems at lower levels.

In the case of FIG. 5, for example, the policies of the sub-system should be combined with those of respective logical service component Si (i=1, 2, 3, 4, 5) in the sub-system, as the effective logical policies of the logical service component Si.

At Step 210, each effective logical policy of each logical service component in the logical service and policy model is mapped to at least one related physical component in the physical service model. In particular, as to each pair of logical service components with dependency (service invocation) relationship in the logical service model, the logical service component serving as service provider should be specified with provider policies, while the logical service component serving as service consumer should be specified with consumer policies.

After the logical service model is transformed into the physical service model, each pair of logical service components with dependency relationship and the logical service dependency relationship between them in the logical service model will be transformed into a set of physical components including at least one physical component in the physical service model depending on the physical topology pattern applied. Thus, when mapping each effective logical policy of each logical service component to the physical service model within a pair of logical service components with dependency relationship, the provider policies of the logical service component serving as service provider and the consumer policies of the logical service component serving as service consumer are mapped to the physical components corresponding to the pair of logical service components and the dependency relationship between them in the physical service model, respectively.

Since each logical service component could serve as either a service provider or a service consumer, both the provider policies of the logical service component in the case of service as service provider and the consumer policies of the logical service component in the case of service as service consumer should be taken into consideration during policy transformation.

The policy transformation is described in the following. In FIG. 5, the logical policy 1.1 in the logical service model is mapped as $IP_1+IPP_6+SP_1$ in the physical service model. That is to say, a logical service inbound policy of the logical service component SL1 is mapped to bus-ranged inbound service destination, SP1 outbound service destination, and SP1 in the physical service model, respectively. During the logical policy transformation, the policies of each logical service component should not be mapped only to corresponding physical service components, but also to the bus-aware infrastructure artifacts for which policies should be specified in the physical service model.

The transformation process of the effective logical policies from a logical service model to a physical service model is set forth above. As described above, the logical service component, especially the dependency relationship among the logical service components, in the logical service model is a virtualized concept. While the logical service model is transformed into the physical service model depending on the actual situation, a large variety of actual physical components are needed as support for achieving the object of implementing particular functions.

Therefore, after a logical service model is transformed into a physical service model, new service policies must be specified for the newly identified physical components in the physical service model.

The policy transformation method of FIG. 2 may include Step 215, where policies are defined for a newly added physical component in the physical service model, in FIG. 5, for example, inbound policy (GPP) and outbound policy (GCP) are specified for a newly added service gateway in the physical service model.

Returning to FIG. 1, at Step 140, a physical service policy model is generated based on the policy transformation result. It is combined with the physical service model transformed at Step 130 to form the physical service and policy model of the SOA system.

At Step 145, policy orchestration is conducted in the physical service and policy model to ensure the policy consistency between the physical service and policy model and the logical service and policy model. Policy orchestration will be described in detail in the following.

At Step 150, a determination is made after the policy orchestration is conduct as to whether or not the policies in the physical service and policy model are consistent, if there are inconsistent policies, then the process returns to Step 140 to adjust the policies, otherwise it proceeds to Step 155.

At Step 155, a service policy deployment model is generated so that deployable policies are automatically or semi-automatically deployed in the runtime environment. In this step, based on the physical service and policy model, a service policy deployment model is generated which describes the association information about the presence form of deployable physical policies and physical nodes (locations) being the particular deployment subjects of the deployable policies at runtime, as shown in FIG. 5. In particular, the service policy deployment model comprises items like deployable attachment association, deployment association, physical reference association, etc.

The deployable attachment association item specifies information about attachment association form of the deployable policies with respect to corresponding deployment node. With such item, for example, an enforcement policy may be specified to be imbedded into the WSDL of a service and published together with this WSDL, or be specified to be attached into a UDDI or other service registry library, or be specified to be attached to an external attachment file of the policy.

The deployment association item specifies the deployment locations of the deployable policies. The physical reference association item specifies the reference associations among the deployable policies, which are expressed by URLs of the policy deployment locations.

A method for generating a physical service and policy model of a service-oriented architecture system according to an embodiment of the present invention has been described above. In the present embodiment, according to user's requirement firstly a logical, service model, is created or an existing logical service model is obtained directly for a SOA system, and policies are specified for the logical service components and the system therein, to form the logical service and policy model of the SOA system. Then the logical service model is transformed into a physical service model. At the same time the effective policies specified for the logical service components are transformed into deployable physical policies. Thus, automatic service policy integration, transformation, and verification at the design time of the SOA system are realized.

To summarize, in the present embodiment, the automation of service policy integration, transformation, and verification at design time are realized. The logical service model is beneficial to specify policies for virtual subjects including system and sub-system. Policies are orchestrated at logical level so as to reduce the possibility of policy conflict at design time. Combination and decomposition of policy which is directly deploy able are provided.

Figure 3:
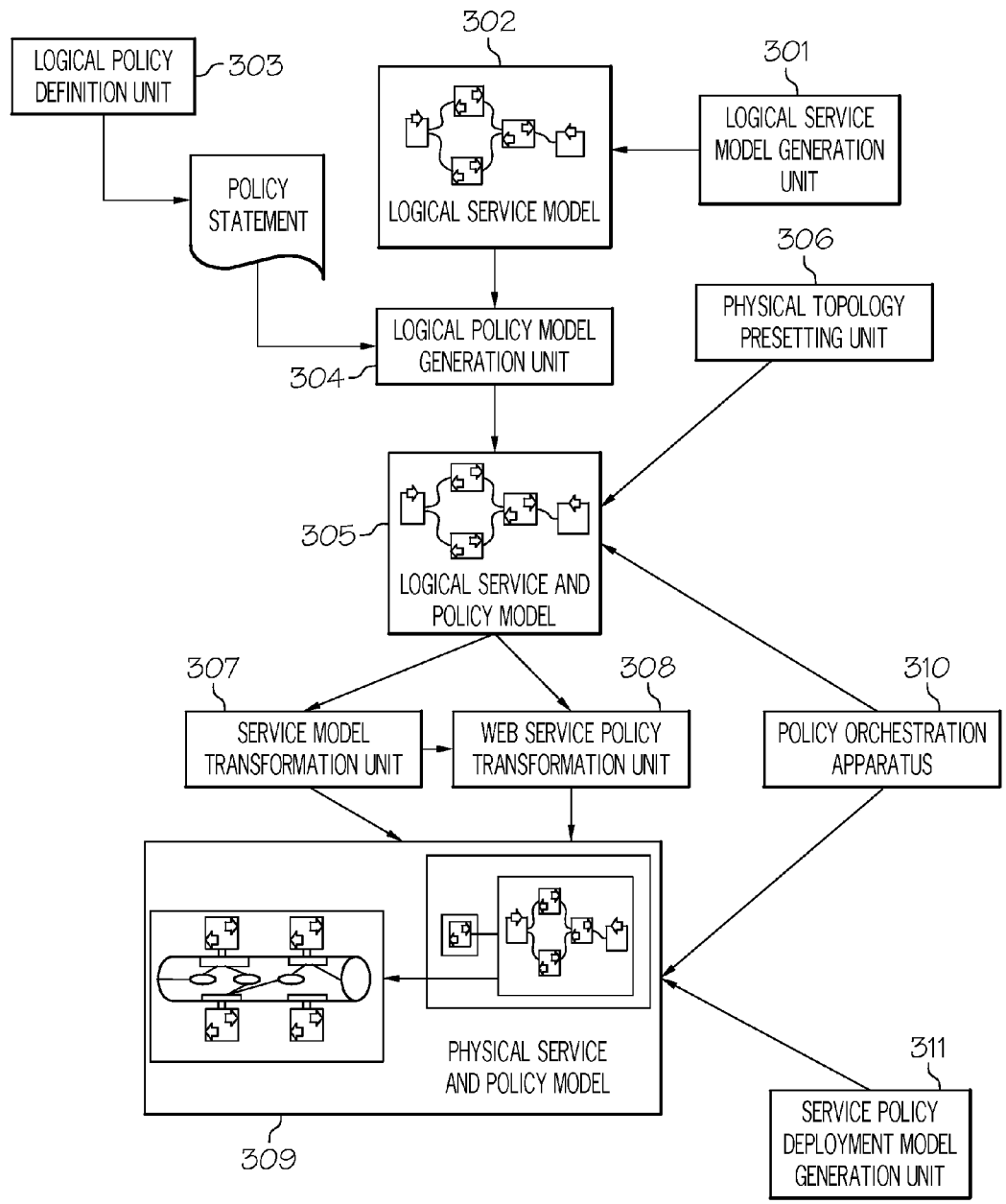
FIG. 3 is a block diagram illustrating a system for generating a physical service and policy model of a service-oriented architecture system according to an embodiment of the present invention.

FIG. 3 is a block diagram illustrating a system for generating a physical service and policy model of a service-oriented architecture system according to an embodiment of the present invention. As shown in FIG. 3, the system 300 for generating a physical service and policy model of a service-oriented architecture system of the present embodiment includes a logical service model generation unit 301, a logical policy definition unit 303, a logical policy model generation unit 304, a physical topology presetting unit 306, a service model transformation unit 307, a web service policy transformation apparatus 308, a policy orchestration apparatus 310, a service policy deployment model generation unit 311.

The logical service model generation unit 301 is used for creating a logical service model 302 for the SOA system for which a physical service and policy model is to be generated, that is, determining a logical model of the logical service components and the logical dependency relationships among the logical service components constituting the designed SOA system.

In the present embodiment, the objective of the logical service model generation unit 301 is to obtain the logical service model of the designed SOA system. That is, in the present embodiment, the logical service model of the SOA system is newly created. However, there is no particular limitation on the way to obtain the logical service model of the SOA system in the present invention, in other embodiments, therefore, the logical service model generation unit 301 may be excluded if a component is included that is able to obtain the corresponding logical service model of the SOA system directly as creation result of other pre-design-phase of the SOA system.

The logical policy definition unit 303 is used to define logical policies for the logical service model 302, and to generate a logical service and policy model 304 of the SOA system based on the logical service model 302. In particular, the logical policy definition unit 303 defines logical policies for the logical service components, the sub-system and the system in the logical service model 302. The logical policies may include reliability messaging policy, security policy, and atomic transaction policy, etc.

The logical policy definition unit 303 contains WS-Policy specification compliant policy language templates of various domains, and provides textual or visual user interface to allow an SOA system designers to define policy statements for each of tire logical service components, the systems, and the sub-systems in the logical service model 302. Generated output of the logical policy definition unit 303 will be sent as input to the logical policy model generation unit 304.

In the present embodiment, the logical policies specified for the logical service model 302 are stored as policy statements. In particular, they can be stored in a single file, a repository or any data sources that can be accessed.

The logical policy model generation unit 304 obtains the logical service model 302 created by the logical service model generation unit 301 and the policy statements defined by the logical policy definition unit 303, which allows the system designer to attach the policy statements to suitable policy subjects in the logical service model 302. The attached policies may specify their own capabilities of the policy subject (provider policies), or specify the capabilities required by the policy subject when it is invoked (consumer policies).

The logical policy model obtained from the logical policy model generation unit 304 and the logical service model 302 of the SOA system together form a logical service and policy model 305 of the SOA system.

The physical topology presetting unit 306 is used for presetting the transformation information about physical topology in the logical service model. In particular, in the present embodiment, the physical topology presetting unit 306 may preset, for the logical service and policy model 305, a physical topology pattern applied when the logical model is transformed into physical model. That is, it may mark a certain granularity of system (several logical service components, a subsystem and a system containing other subsystems and logical service components) in the logical service and policy model 305, and choose for it a physical topology pattern desired to be applied when it is transformed into physical model from available physical topology pattern options, such as ESB pattern option, standard business process pattern option, SCA assembly option, etc. Further, in the present embodiment, the physical topology presetting unit 306 can further preset, for the logical service dependency relationships among the logical service components in the logical service and policy model 305, information allowing for the policy definition of a newly added physical component, that is, preserve a policy interface in the logical service and policy model 305 for the newly appeared physical component after transformation. In particular, it is allowed for presetting, for a invocation link between sub-systems in the logical service and policy model 305, information about the invocation link being to be mapped as a gateway, that is, presetting information about allowing for definition of policies for the physical component, such as gateway, newly appeared on the path of the invocation link in the transformed physical service model.

The service model transformation unit 307 is used for transforming the logical service model in the logical service and policy model 305 into the physical service model of the SOA system. In particular, it transforms the logical service components and the invocation (dependency) relationships among them in respective sub-systems of the logical service and policy model 305 to a physical service model in the preset physical topology pattern, with physical artifacts specific to the physical topology pattern, such as ESB, gateway, message destination, etc, participated in the physical service model.

The web service policy transformation unit 308 is used for transforming the policies of the logical service and policy model 305 to the physical service model, to generate the physical service and policy model 309 of the SOA system. In particular, it maps each effective logical policy of each logical service component in the logical service and policy model 305 to at least one related physical component in the physical service model.

An apparatus for transforming web service policies from a logical model to a physical model will be described in detail in the following taken in conjunction with the accompanying figures.

Figure 4:
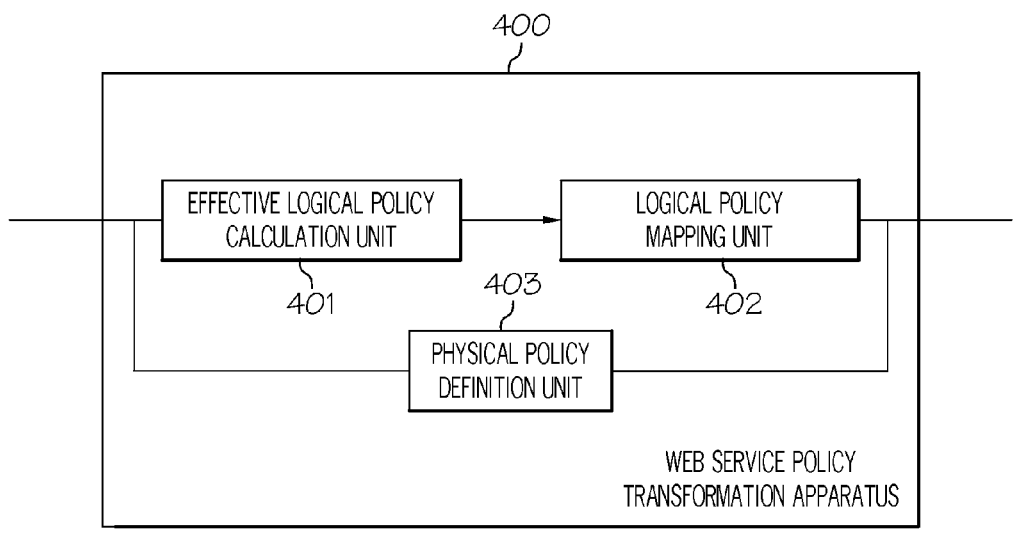
FIG. 4 is a block diagram illustrating an apparatus for transforming web service policies from a logical model to a physical model according to an embodiment of the present invention.

FIG. 4 is a block diagram illustrating an apparatus for transforming web service policies from a logical model to a physical model according to an embodiment of the present invention. As described above, the logical service and policy model 305 comprises a plurality of logical service components and the logical dependency relationships among the plurality of logical service components, and at least one of the logical service components is specified with logical policies. Moreover, the logical service and policy model 305 further comprises a system or sub-system constituting of at least one logical service component; while the physical service and policy model 309 comprises physical components and physical dependency relationships associated with the plurality of logical service components and the logical dependency relationships among tire plurality of logical service components in the logical service and policy model 305 respectively.

As shown in FIG. 4, the apparatus 400 for transforming web service policies from a logical model to a physical model of the present embodiment comprises an effective logical policy calculation unit 401, a logical policy mapping unit 402, and a physical policy definition tool 403.

The effective logical policy calculation unit 401 is used for calculating effective logical policies for each of the plurality of logical service components in the logical service and policy model 305.

In particular, tire effective logical policy calculation unit 401 calculates effective logical policies for respective logical service components in the logical service and policy model 305 as follows: as to the system including at least one logical service component in the logical service and policy model 305, if it is specified with corresponding logical policies, then, for each logical service component in the system takes the union set of its logical policies and the logical policies of the system; as to the first-level sub-system including at least one logical, service component in the logical service and policy model 305, if it is specified with corresponding logical policies, then, for each logical service component in the first-level sub-system takes the union set of its logical policies and the logical policies of the first-level sub-system and the logical policies of the system the first-level sub-system belongs to; as to the nested sub-systems at lower levels, deduce in the same way.

The logical policy mapping unit 402 is used for mapping each effective logical policy of each logical service component in the logical service and policy model 305 to at least one related physical component in the physical model. This unit mainly accomplishes the transformation of logical policies into physical policies.

In particular, when mapping each effective logical policy of each logical service component to the physical service model within a pair of logical service components with dependency relationship, it maps the provider policies of the logical service component serving as service provider and the consumer policies of the logical service component serving as service consumer to the physical components corresponding to the pair of logical service components with dependency relationship and the dependency relationship in the physical service model, respectively.

The physical policy definition unit 403 is used for defining policies for the newly added physical components in the physical service and policy model. While the logical service model is transformed into the physical service model, depending on the actual situation, a large variety of actual physical components are needed as support for achieving the objective of implementing particular functions. The physical policy definition tool 403 specifies service policies for the newly appeared physical components in the physical service model. For example, inbound policy and outbound policy are specified for a newly identified service gateway in the physical, service model.

However, it is noted that the physical policy definition unit 403 is not essential, but is an additional component that further insures the integrity, correctness of the generated physical service and policy model. Objectives of the present invention can be achieved without the physical policy definition unit, Now returning to FIG. 3, the policy orchestration apparatus 310 is used for orchestrating policies in the logical service and policy model 305 to ensure the consistency and for orchestrating policies in the physical service and policy model 309 to ensure policy consistency between the physical service and policy model 309 and the logical service and policy model 305, Policy orchestration apparatus 310 will be described in detail in the following.

The service policy deployment model generation unit 311, based on the physical service and policy model 309, generates a service policy deployment model, which describes the association information about the presence form of deployable physical policies and physical nodes (locations) being the particular deployment subjects of the deployable policies at runtime, so as to automatically or semi-automatically deploy the deployable policies into the runtime environment. The service policy deployment model was described in detail above in conjunction with FIG. 1.

A system for generating a physical service and policy model of a service-oriented architecture system according to an embodiment of the present invention has already been described. In the present embodiment, according to a user's requirement, a logical service model is first created or an existing logical service model is obtained directly for a SOA system. Policies are specified for the logical service components and the system therein to form the logical service and policy model of the SOA system. Then the logical service model is transformed into physical service model, while the effective policy specified for the logical, service components are transformed into deployable physical policies. Thus, automatic service policy integration, transformation, and verification at the design time of the SOA system are realized.

To summarize, in the present embodiment, the automation of service policy integration, transformation, and verification at design time are realized. The logical service model is beneficial for specifying policies for virtual subjects including systems and sub-systems. Policies are orchestrated at logical level so as to reduce the possibility of policy conflict at design time. Policy combination and decomposition is provided which is directly deployable.

The system for generating a physical service and policy model of a service-oriented architecture system of the present embodiment, the apparatus for transforming web service policies from a logical service and policy model to a physical service and policy model, and the various constituent components therein may be implemented as hardware circuits, such as, Grand Scale Integration Circuit or gate array, or semiconductor such as logical chip, transistor, or programmable hardware devices such as Field Programmable Gate Array, Programmable Logical Device, or may be realized by means of various types of processors executing corresponding software, or may be realized by the combination of the hardware circuit and software. And such various constituent components may be implemented physically centralized together, or be collaborated operationally while physically separate.

A method for orchestrating policies in a service model of a service-oriented architecture system of the present invention will be described in detail in the following taken in conjunction with the accompanying figures.

Figure 6:
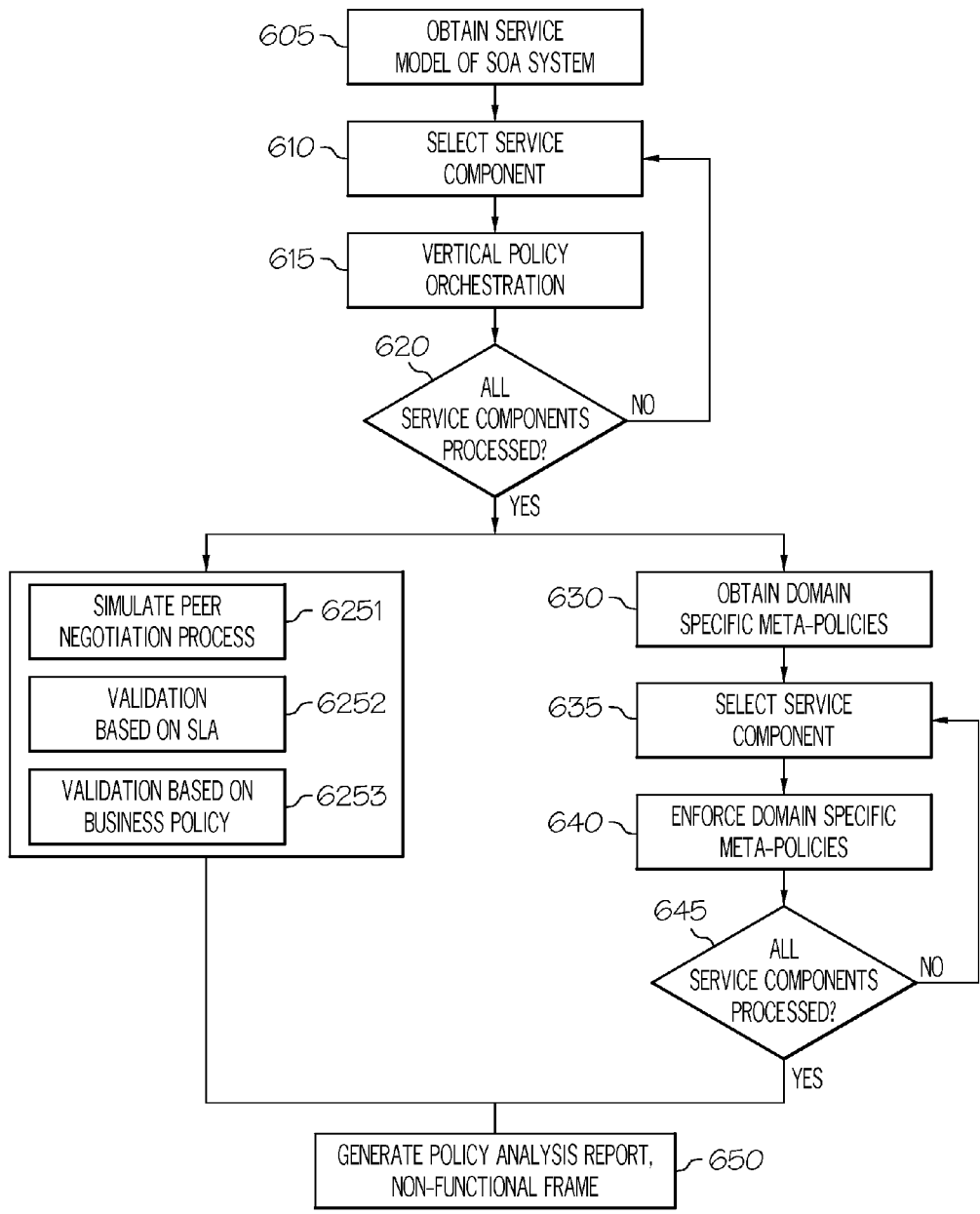
FIG. 6 is a flow chart illustrating a method for orchestrating the policies in a service model of a service-oriented architecture system according to an embodiment of the present invention.

FIG. 6 is a flow chart illustrating a method for orchestrating policies in a service model of a service-oriented architecture system according to an embodiment of the present invention. As shown in FIG. 6, first at Step 605, the service model of the SOA system is obtained. The service model comprises a plurality of service components and the dependency relationships among tire service components.

In the service model, each service component can implement one or more services specified in detail by WSDL (Web Service Definition Language) as a service provider. Likewise, each logical service component can also invoke zero or more other services as a service consumer.

Moreover, in the service model of the SOA system, the dependency relationships among the service components are represented by directional links. A directional link from one service component to another service component represents the direction of service invocation from service consumer to service provider.

Further, in the service model of the SOA system, a system or a sub-system may sometimes exist. A system or a sub-system is a set of service components with virtual boundary and relationship. A system may contain one or more sub-systems.

Figure 8:
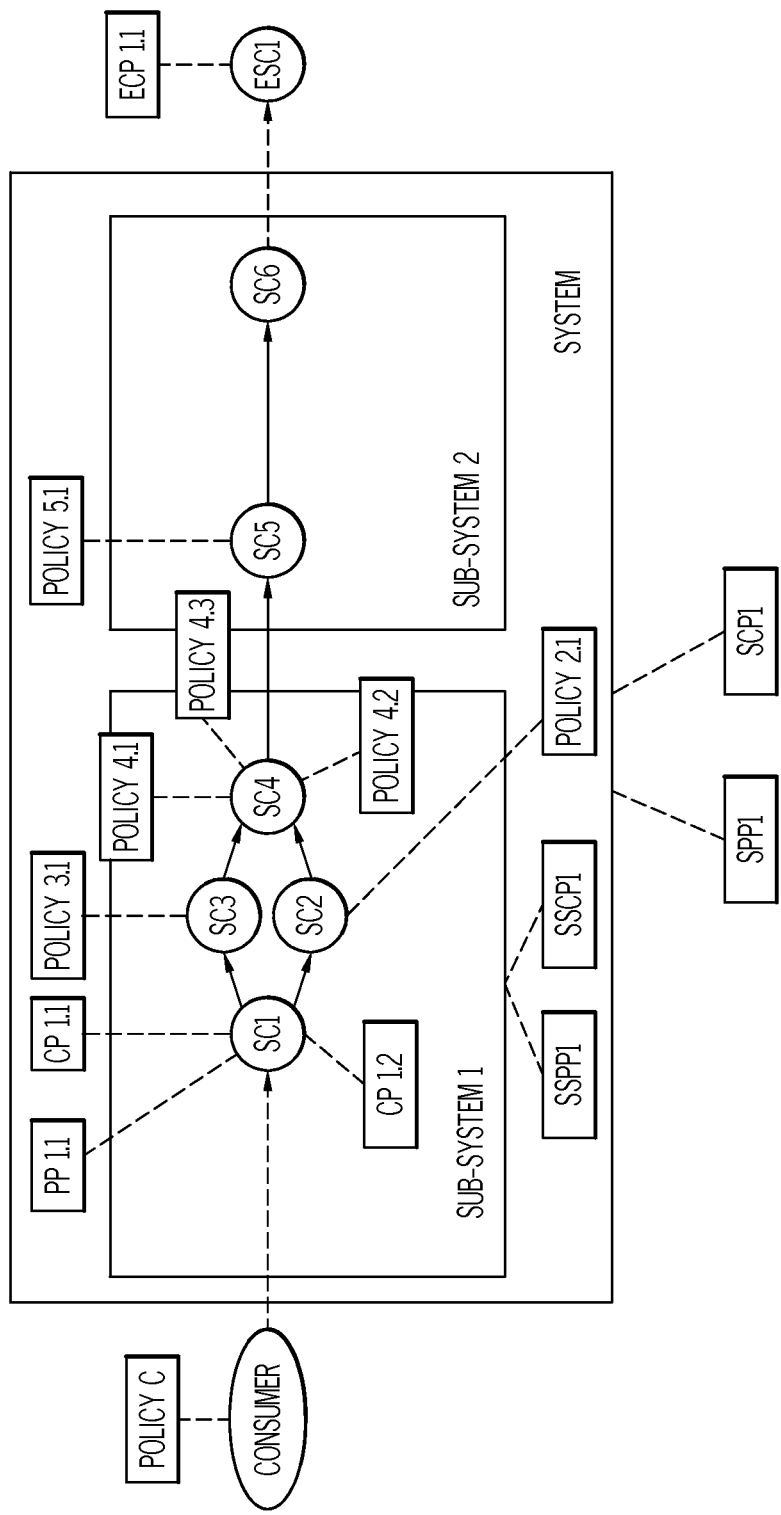
FIG. 8 illustrates a service model of an exemplary SOA system.

The service model of the SOA system will be specifically described in the following by way of an example. FIG. 8 illustrates an exemplary service model of a SOA system. As shown in FIG. 8, the service model of the SOA system comprises a plurality of logical service components SC1, SC2, SC3, SC4, SC5, and SC6, each of which can implement one or more services. The service components are connected by arrows "→" representing the dependency relationships among them. Each arrow "→" represents the direction of service invocation from service consumer to service provider. Furthermore, in the service model of the SOA system, the service components SC1, SC2, SC3, SC4 and the dependency relationships among them form sub-system 1, the service components SC5, SC6 and the dependency relationship between them form sub-system 2, while the sub-system 1 and the sub-system 2 and the dependency relationship between them constitute the whole system. Furthermore, the service components SC1, SC3, SC4, SC5, the sub-system 1, and the system are specified with one or more policies respectively.

It is noted that the service model of the SOA system in FIG. 5 is only illustrative and that the drawing is not meant to limit the form of the service model in the present invention. There is no particular limitation on the form of the service model of the SOA system in the present invention. Further, only six logical service components and two sub-systems are illustrated in FIG. 8 for ease of description. In practice, along with the development of the web service architecture, the functions to be implemented and the services to be provided by a SOA system will be more diverse, and the logical service model will be far more complex than that shown in the figure. Moreover, although only the logical service model is shown in FIG. 8, the method of the present invention is also appropriately applied to the physical service model.

Referring temporarily back to FIG. 6, the objective of Step 605 is to obtain the service model of the designed SOA system. That is, in the present embodiment, the service model of the SOA system may be obtained in any manner; it may be newly created manually, or obtained directly as corresponding creation result of other pre-design-phase of the SOA system.

Then at Step 610-620, vertical policy orchestration is performed on each of the plurality of service components in the service model.

In particular, at Step 610, a subject, namely a service component, on which vertical policy orchestration is to be performed, is selected from the service model. At Step 615, vertical policy orchestration is performed on the service component selected from the plurality of service components, hi particular, all effective policies that will be enforced on the service component are aggregated.

Policies of a service component may comprise service provider policies when the service component serves as a service provider and service consumer policies when the service component serves as a service consumer. These policies, in particular, may be specified with respect to the operation, port, port type, and message of the service component. While aggregating effective policies for a service component, all policies specified directly for the component are taken into consideration. Further, since the policies of the system aid the sub-system to which the service component belongs are also effective for the service component, while aggregating policies for the service component, the policies specified for the system and the sub-system that it belongs to are also taken into consideration.

Thus, in this step, with respect to the service component SC, the final effective policies thereof are calculated according to the following formula:

$$AP(S)=\text{Aggregate}(PP,\text{Nesting}(SSP1,\ldots SSPn),SP)$$

wherein
PP is the policies specified for the service component SC,
SPPi is the policies specified for the sub-system i,
SP is the policies specified for the system.

Aggregate( ) is a function to calculate the "AND" set of the policies as parameter using an algorithm defined in the web service policy attachment (WS-Policy Attachment). Nesting( ) is a function to resolve the policy conflict between the nested sub-systems intersecting partly with each other. That is to say, as the service component SC belongs to a plurality of partly-intersecting sub-systems SSP1, . . . SSPn simultaneously, for the service component SC, it is the function of Nesting( ) that check and resolve the policy conflict between the nested sub-systems.

The policy conflict between the nested sub-systems in the service model may be resolved based on execution sequence, while the policy conflict between different subject levels may be resolved by assertion overriding according to subset relation among the subjects. Moreover, the policy conflict between subjects may also be resolved based on predetermined policy priority.

At Step 620, a decision is made whether or not the policy aggregating has been performed on all service components in the service model. If so, the process proceeds to Step 625, otherwise it returns to Step 610 to select the next service component.

Then at Step 625-645, horizontal orchestration is performed on the effective policies of the plurality of service components per application domain. The effective policies calculated for these service components during Step 610-620 are applied in this phase, to realize the horizontal policy orchestration for the service components with dependency relationship.

In the horizontal policy orchestration phase, the following two types of policy orchestrations may be performed simultaneously or successively: Simulation validation and meta-policy based orchestration. Initially the first type of policy orchestration is described.

At Step 625, simulation validation is performed to validate the policy correctness of each pair of service components with dependency relationship in the plurality of service components. Step 625 cat further be refined to three specific steps 6251, 6252, 6253.

At Step 6251, for each pair of service components with a dependency relationship, especially for each pair of service components with fixed dependency relationship in the system and the sub-system, the consistency between the provider policies of the service component serving as a service provider and the consumer policies of the service component serving as a service consumer is checked by simulating their real peer negotiation process and generating effective policies for service invocation.

At Step 6252, for each pair of service components with a dynamic dependency relationship in the service model by using the SLA (Service Level Agreement) predefined for consumers, the compliance with the SLA of the provider policies of the service component serving as the service provider and the consumer policies of the service component sending as the service consumer is validated.

At Step 6253, for each pair of service components with dynamic dependency relationship in the service model, the compliance with the QoS (Quality of Service) of the provider policies of the service component serving as the service provider and the consumer policies of the service component serving as the service consumer is validated by using the QoS related business policy.

It is noted that the Steps 6251, 6252, 6253 have no mutual dependency relationship. Thus, the sequence in which they are performed is arbitrary. They can be performed either simultaneously or successively.

The second type of policy orchestration will be described now. At Steps 630-645, meta-policy based orchestration is performed on the effective policies of the plurality of service components.

First at Step 630, the application domain specific meta-policies for policy orchestration in the service model are obtained. In the present embodiment, the objective of Step 630 is to obtain the application domain specific meta-policies, and there is no particular limitation on how to obtain the meta-policies. In the present embodiment, therefore, the application domain specific meta-policies for policy orchestration may either be predefined for corresponding application domain and stored in a meta-policy repository, or be newly defined for the application domain.

The application domain specific meta-policies for policy orchestration in the present embodiment will be described in detail in the following. Based on the nature of application domains of an SOA system, the policies of the subjects of an application domain are reliant on each other. Thus, in the present embodiment, the form of meta-policies for policy orchestration is defined to include: target relation type among service components (such as dependency relationship linkage, subset relation, etc), constraint for the services with target relation type.

Further, according to the requirement of policy validation, two types of meta-policies for policy orchestration are defined:

MPT1: correctness of policy presence;
MPT2: consistency of policies.

Taking the service model of the SOA system in FIG. 8 as an example, in the case of web service reliable messaging (WS-RM), the target relation type is invocation link, and there exists the following meta-policy:

MPT1: RM (SC1, SC3) A EP (SC1, SC2, SC3)→RM (SC1, SC2) A RM (SC3)

As to the value of assertion inactiveTimeout of the WS-RM policy, if SC1, SC2 are elements of an execution path, then there exists the following meta-policy:

MPT2: L (SC1)<L (SC2)→IT (SC1)> IT (SC2)

wherein L (SC2) is the location of SC2 on the execution path, and IT (SC1) is the value of inactiveTimeout of SC1.

In the case of web service transaction (WS-transaction), the target relation type is subset, and there exists the following meta-policies:

MPT1: TX (SC1) A (L (SC1)<(SC2)→TX (SC2)
MPT2: AT (SS1) A Belong (SC1, SS1)→AT (SC1)

At Step 635, based on the target relation type of the meta-policies for policy orchestration, one or more service components within one application domain in the service model are specified, thereby specifying the scope within which the meta-policy based orchestration will be performed in the service model.

The target relation expresses the dependency relationship among service components, which often comprises a directional link or a subset relation. In FIG. 8, for example, the following execution paths may be defined:

EP1 (Consumer, SC1, SC2, SC4, SC5)
EP2 (Consumer, SC1, SC3, SC4, SC5)

A specific example of the meta-policy is given below. If Consumer$_1$—the header of the path, and Provider$_n$—the tail of the path in the service model both claimed by policies to ensure message reliable, then in order to fulfill the reliable message requirement of consumer$_1$ and the provider$_n$, it is required that all consumer/provider policies along the RMPath are in the modality of WS-RM. Thus, the application domain specific constraint on WS-RM policy attachment can be expressed by the following meta-policy:

Mela-Policy1: {Id="RMChain", Domain="WS-RM", Rule=<RM(Consumer$_1$) AND RM(Provider$_n$) AND Composite(Provider$_i$, Consumer$_{i+1}$) AND Invoke (Consumer$_i$, Provider$_j$) AND Invoke (Consumer$_{i+1}$,Provider$_n$)→(EnableRM(Provider$_j$) A EnableRM(Consumer$_{i+1}$), i=1, 2, ..., n−1, wherein
Consumer$_1$=Header(RMPath),
Provider$_n$=Tail(RMPath),
RMPath=Vector(Consumer$_i$,Provider$_1$, Consumer$_2$, Provider$_2$, ..., Provider$_n$)>}

In the Rule expression of the meta-policy Meta-Policy1, RMPath is a model structure With consumer/provider policies composed by standard Vectors. The meaning of each WS-RM domain-specific predicate is as follows: RM will return whether the policies as parameter has modality WS-RM; Composite will return whether the policies as parameters are of the same service component; Invoke will return whether the consumer-provider policy pair is attached to services having direct or indirect invocation relationship;

EnableRM is an action to specify WS-RM modality policy to corresponding service in parameter, if the service has no such policy attached.

At Step 640, the meta-policies for policy orchestration, which are specific to the application domain that one or more selected components belong to, are enforced on the service components, to check the consistency and correctness of their policies. In the case that policy conflict exists, the policy conflict may be automatically resolved by allowing the policy with higher priority to take precedence over the inconsistent policy with lower priority.

At Step 645, a decision is made whether or not the meta-policy based orchestration has been performed on all service components in the service model. If so, then the process proceeds to Step 650, otherwise it returns to Step 635 to continue to select the service component having not been orchestrated.

It is note that the two types of policy orchestrations, correspondingly Step 625 and Step 630-640 have no mutual dependency relationship. Thus, they can be performed in any order or even concurrently.

At Step 650, a policy analysis report and the non-functional infrastructure of the service model or one of them is generated respectively based on the result of the policy orchestrations, for reference during design and implementation phase of the service components.

In the present embodiment, the non-functional infrastructure comprises the non-functional capabilities of service components, additional policy assertions, framework of supplemental component for non-functional infrastructure. Non-functional capabilities of service components include the non-functional features, such as the reliable messaging, transaction and security features.

The additional policy assertions could be added automatically for consistency and correctness of policies in system level. For example, for orchestration of transaction policy, if TX (SC1) and! TX (SC2), applying MPT1: TX (SC1) A (L (SC1)<(SC2))→TX (SC2), an Atomic Transaction assertion will be inserted into the provider policy of SC2 to realize support for the Atomic Transaction feature for TX (SC2)

The framework of supplemental components for non-functional infrastructure is generated to rill any gap of policy conflict that could not be automatically resolved. For example, if AT (SC4) and BA (SC5), an additional non-functional component should be generated to convert between the two different transaction types.

A method for orchestrating policies in a service model of a service-oriented architecture system according to the present embodiment has been described. The present invention initially targets the particular components in the service model of the service-oriented architecture system, aggregates effective policies for them to perform vertical policy orchestration: then depending on the difference of application domains in the SOA system, performs horizontal policy orchestration. Thus, in the present embodiment it is possible that the correctness and consistency of service policies may be validated at the design time of the SOA system, while automatic policy conflict detection/solving is conducted, and policy analysis report and non-functional infrastructure of the service model are generated based on the result of the policy validation.

Figure 7:
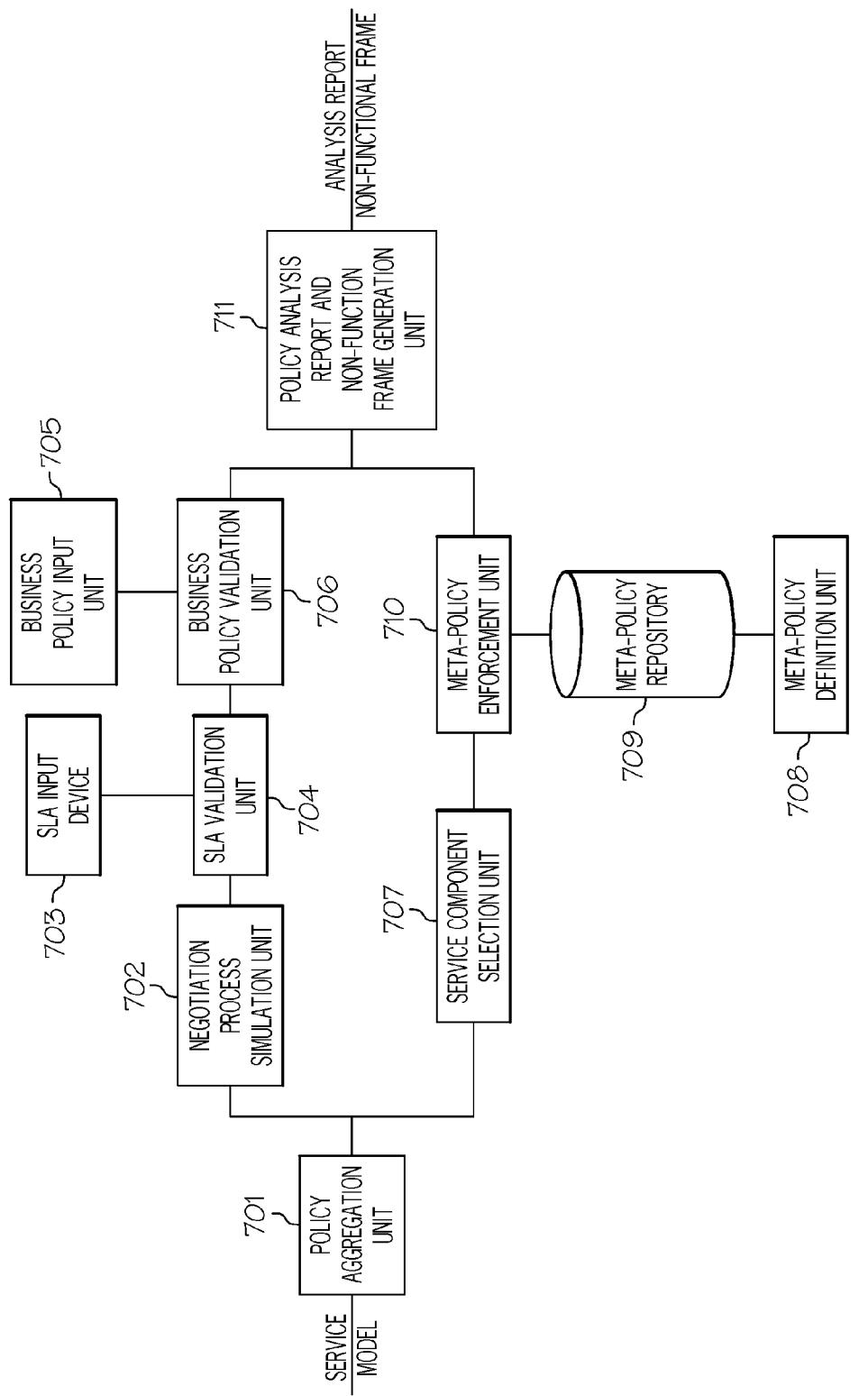
FIG. 7 is a block diagram illustrating a system for orchestrating the policies in a service model of a service-oriented architecture system according to an embodiment of the present invention.

FIG. 7 is a block diagram illustrating a system for orchestrating policies in a service model of a service-oriented architecture system according to an embodiment of the present invention. As shown in FIG. 7, the system 700 for orchestrating policies in a service model of a service-oriented architecture system of the present embodiment comprises: a policy aggregation unit 701, a negotiation process simulation unit 702, a SLA input unit 703, a SLA validation unit 704, a business policy input unit 705, a business policy validation unit 706, a service component selection unit 707, a meta-policy definition unit 708, a meta-policy repository 709, a meta-policy enforcement unit 710, a policy analysis report and non-functional infrastructure generation unit 711.

The policy aggregation unit 701 is used for, according to the service model obtained from exterior, aggregating for each of a plurality of service components in the service model the effective policies that will be enforced on the service component. As described above, the service model comprises a plurality of service components and the dependency relationships among the service components, and at least one service component has been specified with policies. The policy combination unit 701 can operationally implement the vertical policy orchestration phase in the policy orchestration method described in conjunction with FIG. 6.

The negotiation process simulation unit 702 is used for, for each pair of service components with a dependency relationship in the service model, checking the consistency of tire provider policies and the consumer policies by simulating their real peer negotiation process.

The SLA input unit 703 is used for inputting the SLA (Service Level Agreement) predefined for consumers, and converting the SLA to the form usable to the policy orchestration system 700. Tire SLA validation unit 704 is used for validating, according to the SLA inputted by the SLA input unit 703, the compliance with the SLA of the corresponding provider policies and consumer policies of each pair of service components with dependency relationship in the service model.

The business policy input unit 705 is used for inputting the predefined QoS (Quality of Service) related business policy, and converting the business policy to the form usable to the policy orchestration system 700.

The business policy validation unit 706 is used for validating, by using the QoS (Quality of Service) related business policy inputted by the business policy input unit 705, the compliance with the business policy of the corresponding provider policies and consumer policies of each pair of service components with a dependency relationship in the service model.

The service component selection unit 707 is used for specifying one or more service components within one application domain in the service model, thereby specifying the scope of the meta-policy based orchestration in the service model.

The meta-policy definition unit 708 is used for defining the meta-policies for policy orchestration for all application domains in the service model.

The meta-policy repository 709 is used for storing the application domain specific meta-policies for policy orchestration defined by the meta-policy definition unit 708.

The meta-policy enforcement unit 710 is used for, according to one or more service components selected by the service component selection unit 707, obtaining the defined meta-policies for policy orchestration which are specific to the application domain that these service components belong to from the meta-policy repository, and enforcing the meta-policies on these service components, to check the consistency and correctness of their policies.

The policy analysis report and non-functional infrastructure generation unit 711 is used for, according to the result of orchestration by the meta-policy enforcement unit 710, the negotiation process simulation unit 702, the SLA validation unit 704, and the business policy validation unit 706, generating a policy analysis report and the non-functional infrastructure or one of them.

The meta-policy enforcement unit 710, the negotiation process simulation unit 702, the SLA validation unit 704, and the business policy validation unit 706 can operationally implement the horizontal policy orchestration phase in the policy orchestration method described in conjunction with FIG. 6.

It is noted that the negotiation process simulation unit 702, the SLA validation unit 704, and the business policy validation unit 706 have no mutual dependency relationship. Thus, the connection sequence among them is arbitrary, and they can be either sequentially connected or parallel connected.

A system for orchestrating policies in a service model of a service-oriented architecture system according to the present embodiment has been described. The present invention initially targets the particular components in the service model of the service-oriented architecture system, aggregates effective policies for them to perform vertical policy orchestration; then depending on the difference of application domains in the SOA system, performs horizontal policy orchestration. Thus, in the present embodiment, it is possible that the correctness and consistency of service policies are validated at the design time of the SOA system, while automatic policy conflict detection/solving is conducted, and policy analysis report and non-functional infrastructure of the service model are generated based on the result of the policy validation.

A method for orchestrating policies in a service model of a service-oriented architecture system according to an embodiment of the present invention includes performing vertical policy orchestration on each of a plurality of service components in the service model to obtain the effective policies of the service component and performing horizontal orchestration on the effective policies of the plurality of service components per application domain.

The service model may further comprise a system, to which at least one of the plurality of service components belongs, and for which policies are specified. Also, the step of performing vertical policy orchestration on each of the plurality of service components in the service model may comprise, for each service component in the system, calculating the AND set of its policies and the policies of the system.

The system may further comprise a sub-system, to which at least one of the service components of the system belongs, and for which policies have been specified; the step of performing vertical policy orchestration on each of the plurality of service components in the service model may comprise, for each service component in the sub-system, calculating the AND set of its policies and the policies of the system and tire policies of the sub-system.

The system may further comprise a first sub-system and a second sub-system, to both of which at least one of the service components of the system belongs, and for both of which policies have been specified; the step of performing vertical policy orchestration on each of the plurality of service components in the service model may comprise: checking whether or not there is policy conflict between the first sub-system and the second sub-system; when there is any policy conflict between the first sub-system and the second sub-system, resolving the policy conflict; and for each service component belonging to both the first sub-system and the second sub-system, calculating the AND set of its policies and the policies of the system, the policies of the first sub-system and the policies of the second sub-system.

The step of resolving the policy conflict may comprise: resolving the policy conflict between the sub-systems according to any one of execution sequence, subset relation and predefined policy priority.

The step of performing horizontal orchestration on the effective policies of the plurality of service components per application domain may comprise: validating the policy correctness of each pair of service components with dependency relationship in the plurality of service components.

The step of validating the policy correctness of each pair of service components with dependency relationship in the plurality of service components may comprise, for the pair of service components with a dependency relationship, checking the policy consistency by simulating a peer negotiation process.

The step of validating the policy correctness of each pair of service components with a dependency relationship in the plurality of service components may comprise, by using predefined Service Level Agreement (SLA), validating the policies of the service components with the dependency relationship.

The step of validating the policy correctness of each pair of service components with a dependency relationship in the plurality of service components may comprise, by using Quality of Service (QoS) related business policy, validating the policies of the service components with the dependency relationship.

The step of performing horizontal orchestration on the effective policies of the plurality of service components per application domain may comprise: orchestrating the effective policies of the plurality of service components according to the meta-policies of corresponding application domains.

The step of orchestrating the effective policies of the plurality of service components according to the meta-policies of corresponding application domains may further comprise: defining meta-policies for policy orchestration for the plurality of service components; specifying one or more service components to define the performing scope of policy orchestration; and applying the meta-policies for policy orchestration to the specified one or more service components to validate the consistency and correctness of their policies. The meta-policies for policy orchestration may be composed of: target relation type among service components and constraint on the services with target relation type.

The step of specifying one or more service components may comprise: according to the target relation type of the meta-policies for policy orchestration, specifying one or more associated service components as the performing scope of the policy orchestration.

The method for orchestrating policies in a service model of a service-oriented architecture system according to an embodiment of the present invention may further comprise: generating non-functional infrastructure of the plurality of service components based on the result of the policy orchestrations.

The step of generating non-functional infrastructure of the plurality of service components based on the result of the policy orchestrations may comprise: generating policy analysis report of the plurality of service components based on the result of the policy orchestrations.

The step of generating non-functional infrastructure of the plurality of service components based on the result of the policy orchestrations may comprise: adding additional policy assertions for ensuring the consistency and correctness of policies.

The step of generating non-functional infrastructure of the plurality of service components based on the result of the policy orchestrations may comprise: generating framework of supplemental component for non-functional infrastructure for the policy conflict that has not been resolved.

An apparatus for orchestrating policies in a service model of a service-oriented architecture system according to an embodiment of the present invention may comprise: a vertical policy orchestration unit, for performing vertical policy orchestration on each of the plurality of service components in the service model to obtain the effective policies of the service component; and a horizontal policy orchestration unit for performing horizontal orchestration on the effective policies of the plurality of service components per application domain.

The service model may comprise a first sub-system and a second sub-system, to both of which at least one of the plurality of service components belongs, and both of which have been specified with policies; wherein the vertical policy orchestration unit may comprise: a policy conflict resolving unit, for checking whether or not there is policy conflict between the first sub-system and second sub-system, and when there is any policy conflict, resolving the policy conflict.

The horizontal policy orchestration unit may comprise: a policy correctness validation unit, for validating tire policy correctness of each pair of service components with dependency relationship in the plurality of service components.

The policy correctness validation unit may comprise: a negotiation process simulation unit, for the pair of service components with dependency relationship, for checking the policy consistency by simulating a peer negotiation process.

The policy correctness validation unit may comprise: an SLA validation unit for, by using predefined Service Level Agreement (SLA), validating the policies of the service components with dependency relationship.

The policy correctness validation unit may comprise: a business policy validation unit for, by using Quality of Service (QoS) related business policy, validating the policies of the service components with dependency relationship.

The horizontal policy orchestration unit may comprise; a meta-policy orchestration unit, for orchestrating the effective policies of the plurality of service components according to the meta-policies of corresponding application domain.

The meta-policy orchestration unit may comprise: a meta-policy definition unit, for defining meta-policies for policy orchestration for tire plurality of service components; and a meta-policy repository, for storing the defined meta-policies for policy orchestration.

The meta-policy orchestration unit may further comprise: an orchestration scope selection unit, for specifying one or more service components to define the performing scope of policy orchestration.

The meta-policy orchestration unit may further comprise: a meta-policy enforcement unit, for applying the meta-policies for policy orchestration to the specified one or more service components to validate the consistency and correctness of their policies.

The apparatus for orchestrating policies in a service model of a service-oriented architecture system according to an embodiment of the present invention may further comprise: a non-functional infrastructure generation unit, for generating non-functional infrastructure of the plurality of service components based on the result of the policy orchestrations.

Although the method and system for generating a physical service and policy model of a service-oriented architecture system and the method and apparatus for transforming web service policies from logical model to physical model have been described hereinbefore in detail by way of several illustrative embodiments, the above embodiments are not exhaustive, and various changes and modifications may be made by the skills in the art within the spirit and scope of the present invention. Therefore, the present invention is not limited to such embodiments and its scope is defined only by the appended claims.

What is claimed is:

1. A method for transforming web service policies from a logical model to a physical model, wherein the logical model comprises a plurality of logical service components and logical dependency relationships among the plurality of logical service components, at least one of the plurality of logical service components being specified with logical policies, the physical model comprises physical components and physical dependency relationships associated with the plurality of service components and logical dependency relationships among the plurality of service components in the logical model, the method comprising:

calculating effective logical policies for each of the plurality of logical service components in said logical model; and mapping each effective logical policy of each logical service component in said logical model to at least one associated physical component in said physical model;

wherein said logical model further comprises a system to which at least one of said plurality of logical service components belongs and which has been specified with logical policies, and wherein calculating the effective logical policies for each of the plurality of logical service components in said logical model further comprises, for each logical service component in said system, taking the AND set of its logical policies and the logical policies of the system as the effective logical policies of the service component.

2. A method according to claim 1, wherein said system further comprises a sub-system to which at least one of the logical service components of the system belongs, and which has been specified with logical policies, and wherein calculating the effective logical policies for each of the plurality of logical service components in said logical model further comprises, for each logical service component in said sub-system, taking the AND set of its logical policies and the logical policies of the sub-system, as the effective logical policies of the service component.

3. A method according to claim 1, wherein said plurality of logical service components comprise a first logical service component and a second logical service component, said first logical service component has been specified with provider policies, said second logical service component has been specified with consumer policies, and said first and second logical service components and the logical service dependency relationship between them correspond to a set of physical components in said physical model, and wherein mapping each effective logical policy of each logical service component in said logical model to at least one associated physical component in said physical model further comprises mapping the provider policies of said first logical service component and the consumer policies of said second logical service component correspondingly to the physical components in said set of corresponding physical components, respectively.

4. A method for transforming web service policies from a logical model to a physical model, wherein the logical model comprises a plurality of logical service components and logical dependency relationships among the plurality of logical service components, at least one of the plurality of logical service components being specified with logical policies, the physical model comprises physical components and physical dependency relationships associated with the plurality of service components and logical dependency relationships among the plurality of service components in the logical model, the method comprising:
  calculating effective logical policies for each of the plurality of logical service components in said logical model;
  mapping each effective logical policy of each logical service component in said logical model to at least one associated physical component in said physical model; and
  performing policy orchestration in said logical model to ensure policy consistency.

5. A method according to claim 4 further comprising performing policy orchestration in said physical model to ensure policy consistency between said logical model and said physical model.

6. A method according to claim 5 wherein performing policy orchestration further comprises:
  performing vertical policy orchestration on each of the plurality of service components in said logical model, to obtain the effective policies of the service component; and
  performing horizontal orchestration on the effective policies of said plurality of service components per application domain.

7. A method according to claim 6 wherein said logical model further comprises a system to which at least one of said plurality of service components belongs, and which has been specified with policies; said system further comprises a first sub-system and a second sub-system, to both of which at least one of the service components of the system belongs, and both of which have been specified with policies, and performing vertical policy orchestration on each of the plurality of service components in said service model further comprises:
  checking whether or not there is policy conflict between said first sub-system and said second sub-system;
  when there is a policy conflict between said first sub-system and said second sub-system, resolving the policy conflict;
  for each service component belonging to the system, calculating the AND set of its policies and the policies of the system; and
  for each service component belonging to both the first sub-system and the second sub-system, calculating the AND set of its policies and the policies of said system, the policies of the first sub-system and the policies of the second sub-system.

8. A method according to claim 6 where performing horizontal orchestration on the effective policies of said plurality of service components per application domain comprises:
  defining meta-policies for policy orchestration on said plurality of service components;
  specifying one or more service components to define the scope of policy orchestration; and
  applying the meta-policies for policy orchestration to said specified one or more service components to validate the consistency and correctness of their policies.

9. An apparatus for transforming web service policies from a logical model to a physical model, wherein said logical model comprises a plurality of logical service components and logical dependency relationships among said plurality of logical service components, at least one of said plurality of logical service components being specified with logical policies, said physical model comprises physical components and physical dependency relationships associated with said plurality of service components and logical dependency relationships among said plurality of service components in the logical model, respectively, said apparatus comprising:
  a processor communicatively coupled to a memory, said memory comprising executable code stored thereon that causes said processor, when executing said executable code, to implement:
    a logical policy calculation unit for calculating effective logical policies for each of the plurality of logical service components in said logical model; and
    a logical policy mapping unit for mapping each effective logical policy of each logical service component in said logical model to at least one associated physical component in said physical model;
  wherein said logical model further comprises a system, to which at least one of said plurality of logical service components belongs and which has been specified with logical policies, and wherein said logical policy calculation unit, for each logical service component in said system, takes the AND set of its logical policies and the logical policies of the system as the effective logical policies of the service component.

10. An apparatus according to claim 9 wherein said system further comprises a sub-system to which at least one of the logical service components of the system belongs and which has been specified with logical policies, and wherein said logical policy calculation unit, for each logical service component in said sub-system, takes the AND set of its logical policies and the logical policies of the sub-system as the effective logical policies of the service component.

11. An apparatus according to claim 10, wherein said plurality of logical service components include a first logical service component and a second logical service component, said first logical service component has been specified with provider policies, said second logical service component has been specified with consumer policies, and said first and second logical service component and the logical service dependency relationship between them correspond to a set of physical components in said physical model, and wherein said logical policy mapping unit maps the provider policies of said first logical service component and the consumer policies of said second logical service component correspondingly to the physical components in said set of corresponding physical components, respectively.

12. An apparatus according to claim 11, further comprising a policy orchestration apparatus for orchestrating policies in said logical model to ensure their consistency.

13. A computer program product comprising a computer usable memory embodying program instructions for transforming web service policies from a logical model to a physical model, wherein the logical model comprises a plurality of logical service components and logical dependency relationships among the plurality of logical service components, at least one of the plurality of logical service components being specified with logical policies, the physical model comprises physical components and physical dependency relationships associated with the plurality of service components and logical dependency relationships among the plurality of service components in the logical model, said program instructions when loaded into and executed by a computer causing the computer to perform:
  calculating effective logical policies for each of the plurality of logical service components in said logical model; and
  mapping each effective logical policy of each logical service component in said logical model to at least one associated physical component in said physical model;
  wherein said logical model further comprises a system to which at least one of said plurality of logical service components belongs and which has been specified with logical policies, and wherein program instructions for causing the computer to perform calculating the effective logical policies for each of the plurality of logical service components in said logical model further comprises program instructions for, for each logical service component in said system, taking the AND set of its logical policies and the logical policies of the system as the effective logical policies of the service component.

14. A computer program product according to claim 13 wherein said system further comprises a sub-system to which at least one of the logical service components of the system belongs, and which has been specified with logical policies, and wherein the program instructions for performing calculating the effective logical policies for each of the plurality of logical service components in said logical model further comprises program instructions for, for each logical service component in said sub-system, taking the AND set of its logical policies and the logical policies of the sub-system, as the effective logical policies of the service component.

15. A computer program product comprising a computer usable memory embodying program instructions for transforming web service policies from a logical model to a physical model, wherein the logical model comprises a plurality of logical service components and logical dependency relationships among the plurality of logical service components, at least one of the plurality of logical service components being specified with logical policies, the physical model comprises physical components and physical dependency relationships associated with the plurality of service components and logical dependency relationships among the plurality of service components in the logical model, said program instructions when loaded into and executed by a computer causing the computer to perform:

calculating effective logical policies for each of the plurality of logical service components in said logical model;

mapping each effective logical policy of each logical service component in said logical model to at least one associated physical component in said physical model; and program instructions for performing policy orchestration in said logical model and in said physical model to ensure policy consistency.

16. A computer program product according to claim 15 wherein said plurality of logical service components comprise a first logical service component and a second logical service component, said first logical service component has been specified with provider policies, said second logical service component has been specified with consumer policies, and said first and second logical service components and the logical service dependency relationship between them correspond to a set of physical components in said physical model, and wherein the programming instructions for performing mapping each effective logical policy of each logical service component in said logical model to at least one associated physical component in said physical model further comprises program instructions for mapping the provider policies of said first logical service component and the consumer policies of said second logical service component correspondingly to the physical components in said set of corresponding physical components, respectively.

17. A computer program product according to claim 15 wherein program instructions for performing policy orchestration further comprises program instructions for:

performing vertical policy orchestration on each of the plurality of service components in said logical model, to obtain the effective policies of the service component; and performing horizontal orchestration on the effective policies of said plurality of service components per application domain.

\* \* \* \* \*